Sept. 12, 1933.   J. AVATO   1,926,992
COMBINED PROJECTOR AND SIGNALING LAMP
Filed Sept. 18, 1931
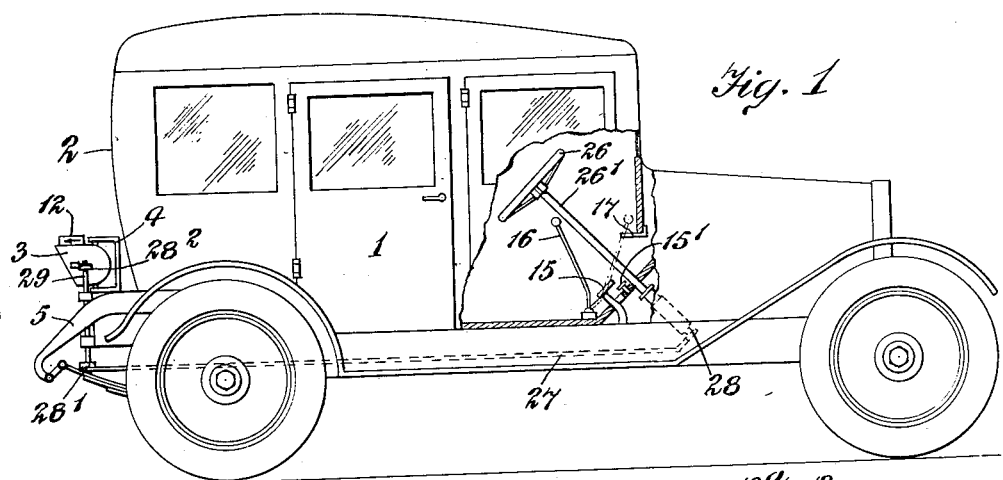
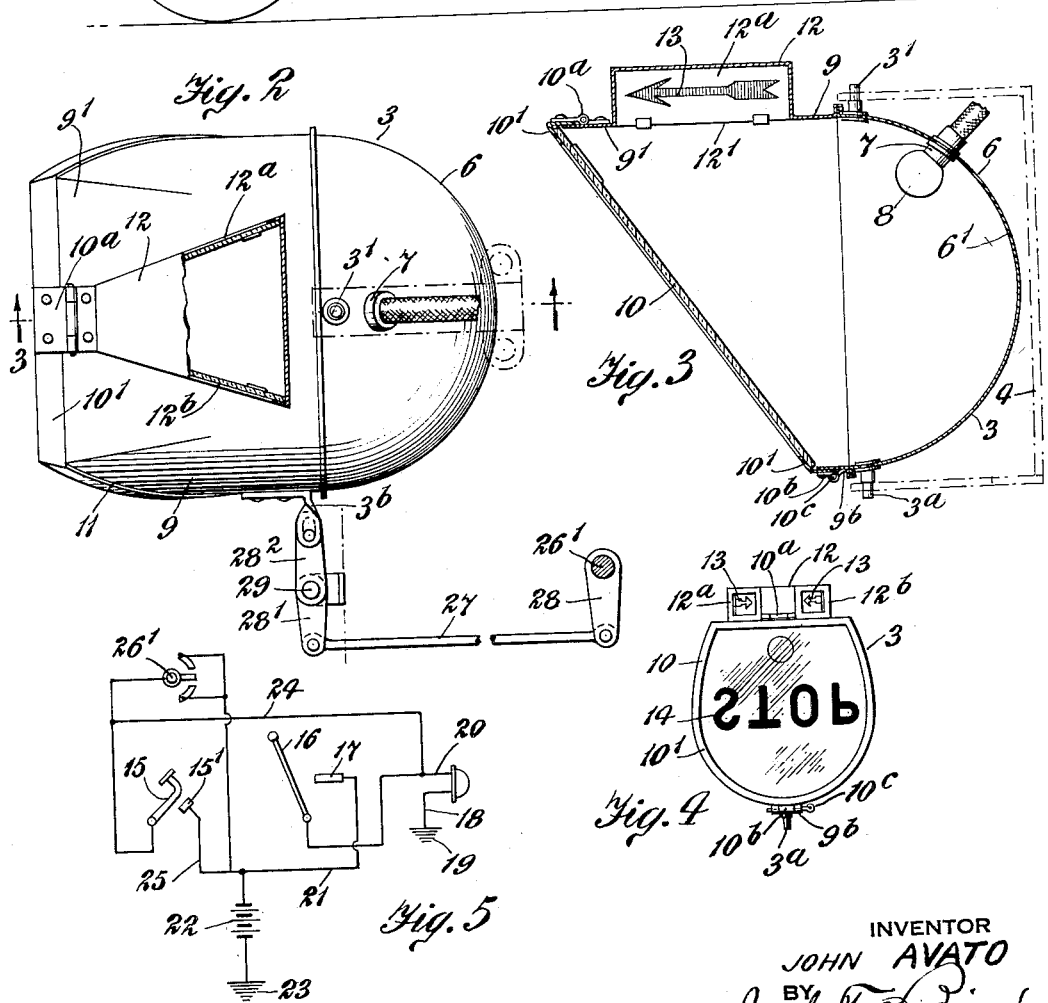
INVENTOR
JOHN AVATO
BY
Joseph F. H. Friew
ATTORNEY Patented Sept. 12, 1933

1,926,992

UNITED STATES PATENT OFFICE 1,926,992

COMBINED PROJECTOR AND SIGNALING LAMP

John Avato, Englewood, N. J.

Application September 18, 1931
Serial No. 563,537

3 Claims. (Cl. 240—7.1)

This invention relates to improvements in combined projector and signaling lamp.

Objects of my invention are to provide a lamp suitable for mounting on the rear end of an automobile and functioning to project a beam of light to the rear of the automobile in order to enable the driver to see the path in which he is backing up; also to function as a signaling light which will first operate automatically by electric connection with the braking pedal to indicate that the vehicle is about to stop; secondly, will project a beam of light showing the word "stop" downwardly upon the roadway, and thirdly, will automatically by mechanical connection with the steering mechanism throw the beam of light in the direction the driver is backing and will also indicate to drivers or other persons in the rear the direction in which the car is about to turn; to provide a lamp having a lens arranged in a downwardly-inclined position to project a beam of light to the roadway at an angle inclined downwardly to the rear of the car and thus to light up the area adjacent to the rear of the car and to prevent the projection of the beam of light above a horizontal plane intersecting the center of the said lamp; to provide a mechanically-actuated mechanism operated by the movement of the steering mechanism of the car for mechanically moving the lamp and an indicating element carried thereby at said rear of the car to indicate the direction in which the steering mechanism is set to move the car; to utilize a movable lamp of the character specified for illuminating and carrying to variable indicating positions a direction-indicating element and to provide a lamp which will serve as a beam projector or spot-light for backing, a stop signaling device, and a direction indicator capable of illumination in the dark.

With these and other objects in view, the invention comprises the combination of members and arrangement of parts so combined as to co-act and co-operate with each other in the performance of the functions and the accomplishment of the results herein contemplated, and comprises in one of its adaptions the species or preferred form illustrated in the accompanying drawing, in which:—

Fig. 1 is a view in side elevation of an automobile showing my combined backing and signaling lamp mounted at the rear thereof and showing the mechanical connection to the wheel;

Fig. 2 is a top view of the lamp shown in Fig. 1;

Fig. 3 is a section on the line 3—3 of Fig. 1 looking in the direction of the arrow;

Fig. 4 is a view in front elevation of the device shown in Fig. 1;

Fig. 5 is a diagrammatic view of a circuit suitable for electrically actuating my said lamp.

Referring now to this drawing which illustrates a preferred embodiment of my invention, 1 indicates the body of an automobile, 2 the rear end thereof, and 3 a lamp embodying my invention which, as shown, is mounted at one side at the rear of the automobile and is preferably pivotally mounted on a bracket 4 which may be fastened to the chassis of the car, the lamp 3 being provided with pivot elements 3' and 3ª which are pivotally mounted in bracket 4 to permit the lamp to swing pivotally in said bracket. The lamp is preferably provided with a rounded rear body portion 6, the interior of which is provided with a suitable reflecting surface 6' and has projecting into the body of the lamp from a point near the top of the lamp a socket 7, in which is mounted a bulb 8. Said lamp 3 is, as shown, provided with a front and forwardly projecting hood portion 9 which is substantially triangular in cross-section and is provided with a glass lens 10 which is substantially shield shaped in conformation, and is mounted in an inclined position in a lens frame 10', hinged at 10ª to a flat top portion 9' of the hood 9 of the lamp. The lower edge is provided with a fastening element 10ᵇ which co-operates with a similar fastening element 9ᵇ on the lower edge of the lamp body. The lens-frame is fastened to the body of the lamp by a pin 10ᶜ. The joint 11 between the lens frame 10' and the hood body 9 may be made water-tight in any suitable manner to prevent the entrance of rain.

The top portion 9' of the hood 9 has, as shown, mounted thereon a substantially triangular casing 12, which communicates at 12' with the body of the lamp and is provided with forwardly converging opposite sides 12ª and 12ᵇ each of which is provided with a translucent arrow, 13.

The lens of the lamp is also preferably provided with an indication comprising the word, "stop" and as illustrated, this word is arranged on the lamp in inverse relationship so that when a light-beam is projected on the roadway the word "stop" in readable position will appear in the beam of light projected.

In accordance with the preferred form of my invention, the lamp 3 is electrically connected in the conventional manner with the braking pedal 15, to the end that the lamp will be automatically illuminated when the brake pedal is depressed and will be automatically extinguished when the brake pedal is released. Said lamp also preferably has electrical connection for automatic operation by the control lever 16, the contact member 17 being so arranged that when said lever 16 is thrown into reverse, electrical connection will be made and the light will be lit and when said lever is moved into any other position, no electric connection will be effected. As illustrated, the lamp circuit is provided with a lead 18 which is grounded at 19. The circuit to the control lever 16 extends through the opposite leg of the circuit by means of the lead 20 to the lever 16, thence through the contact member 17, lead 21 to the battery 22 and the ground 23. The opposite leg of the circuit from the lamp to the pedal 15 extends through the lead 20, lead 24, pedal 15, contact member 15', lead 25 to the battery 22 and the ground 23. It will be understood, however, that any suitable conventional electrical connections may be made for the purpose hereinabove specified.

The lamp 3 is mechanically connected with the steering mechanism of the car, preferably with the steering wheel 26. This connection may be made in any suitable conventional manner now employed for operating spot lights located at the front of a car, it being understood, however, that in applicant's case the conventional connections will be reversed so as to cause the lamp 3 at the rear to be pointed in the proper direction, to indicate intended movement. As illustrated, I make this mechanical connection by means of a reciprocating rod 27 having a rocking connection at 28 with the shaft 26' of the steering wheel 26. The rod 27 which is reciprocated as aforesaid by the shaft 26' of the wheel 26 in turn rocks a crank arm 28 about a pivot rod 29, suitably fastened to the horn 5 of the car. It will be understood, however, that one end 28' of the crank 28 will be connected with the bracket 3b fastened to the lamp 3.

In operation, the lamp will be lighted as a stop signal whenever the braking pedal is depressed and at the same time will light up the rear portion of the car and the roadway contiguous thereto. When the pedal is released, the lamp will be automatically extinguished. When the control lever is put into reverse to back the car, the lamp will be lighted and when the car is steered to one side or the other, or in a straight line, the light beam will be automatically moved into the path in which the car is being backed. The beam will carry an indication which may be read on the roadway and the lamp itself and an indicating element carried and illuminated thereby will function during the day or night to indicate the direction in which the car is to be steered when going forward or backward, it being understood that electrical connection will also be made with the steering mechanism in the same conventional manner as spot lights at the front of an automobile are now operated.

As many changes could be made in the above construction and many apparently widely different embodiments of this invention could be made without departing from the scope thereof; it is intended that all matter contained in the above description or shown in the accompanying drawing shall be interpreted as illustrative and not in a limiting sense.

Having described my invention, I claim:—

1. A combined projector and signaling lamp embodying a pivot member, a lamp body mounted on said pivot member and having a lens mounted in downwardly inclined position to project a beam of light rearwardly and downwardly from said lamp, lamp-swinging mechanism and operable to move the lamp in the direction in which the car is being steered, an electric circuit and electrical means operable simultaneously with said lamp-swinging mechanism for automatically lighting and extinguishing said lamp in varying positions of the control mechanism of the car.

2. A combined backing and signaling lamp embodying a pivot member, a lamp body mounted on said pivot member and having a lens mounted in downwardly inclined position to project a beam of light rearwardly and downwardly from said lamp, lamp-swinging mechanism and operable to move the lamp in the direction in which the car is being steered, an electric circuit, electrical means operable simultaneously with said lamp-swinging mechanism for automatically lighting and extinguishing said lamp in varying positions of the control mechanism of the car, and a signaling device mounted on said lamp for indicating the direction in which the car is to be moved.

3. A combined projector and signaling lamp embodying a pivot member, a lamp body mounted on said pivot member and having a lens mounted in downwardly inclined position to project a beam of light rearwardly and downwardly from said lamp, lamp-swinging mechanism and operable to move the lamp in the direction in which the car is being steered, an electric circuit, electrical means operable simultaneously with said lamp-swinging mechanism for automatically lighting and extinguishing said lamp in varying positions of the control mechanism of the car, and means on the lens for projecting a direction indication on the roadway.

JOHN AVATO.